United States Patent
Lyle et al.

(10) Patent No.: US 9,111,262 B2
(45) Date of Patent: Aug. 18, 2015

(54) EMAIL MESSAGE ASSOCIATION

(75) Inventors: Ruthie D. Lyle, Durham, NC (US); Sean Callanan, Dublin (IE); Patrick Joseph O'Sullivan, Dublin (IE); Fred Raguillat, Dunboyne (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 12/981,712

(22) Filed: Dec. 30, 2010

(65) Prior Publication Data

US 2012/0173634 A1   Jul. 5, 2012

(51) Int. Cl.
- G06F 15/16 (2006.01)
- G06Q 10/10 (2012.01)
- G06Q 50/00 (2012.01)

(52) U.S. Cl.
CPC ............. G06Q 10/107 (2013.01); G06Q 50/01 (2013.01)

(58) Field of Classification Search
CPC ..... G06Q 10/107; G06Q 10/10; G06Q 50/01; H04L 51/14; H04L 12/5855; H04L 12/58; H04L 67/306; H04L 51/08; H04M 1/72552; H04M 2203/4545; H04M 3/53333; G06F 17/30; G06F 17/30882; G06F 17/3089
USPC ........... 709/206; 707/705, 732, 736, 751, 784
See application file for complete search history.

(56) References Cited

U.S. PATENT DOCUMENTS

| | | | |
|---|---|---|---|
| 2006/0020615 A1* | 1/2006 | Keohane et al. | 707/101 |
| 2007/0288575 A1* | 12/2007 | Gillum et al. | 709/206 |
| 2008/0168026 A1* | 7/2008 | Patil et al. | 707/2 |
| 2008/0256188 A1* | 10/2008 | Massand | 709/206 |
| 2008/0270557 A1* | 10/2008 | Bhamidipaty et al. | 709/206 |
| 2009/0029674 A1* | 1/2009 | Brezina et al. | 455/405 |
| 2009/0049140 A1* | 2/2009 | Stoddard et al. | 709/206 |
| 2009/0292776 A1* | 11/2009 | Nesbitt et al. | 709/206 |
| 2009/0313240 A1* | 12/2009 | Gile et al. | 707/5 |
| 2010/0017360 A1* | 1/2010 | Bansal et al. | 707/1 |
| 2010/0017478 A1* | 1/2010 | Mejia et al. | 709/206 |
| 2010/0100599 A1* | 4/2010 | Witzany | 709/206 |
| 2010/0250682 A1* | 9/2010 | Goldberg et al. | 709/206 |
| 2010/0274856 A1* | 10/2010 | Bhadriraju et al. | 709/206 |
| 2010/0306185 A1* | 12/2010 | Smith et al. | 707/709 |
| 2011/0119593 A1* | 5/2011 | Jacobson et al. | 715/736 |
| 2011/0164058 A1* | 7/2011 | Lemay | 345/651 |
| 2011/0231507 A1* | 9/2011 | Appelman | 709/206 |
| 2012/0054289 A1* | 3/2012 | Aytulu et al. | 709/206 |

OTHER PUBLICATIONS

Diehl et al., "Name Reference Resolution in Organizational Email Archives," http://www.siam/org/proceedings/datamining/2006/dm06_007diehlc.pdf; 2006, pp. 70-81.

* cited by examiner

*Primary Examiner* — Dustin Nguyen
*Assistant Examiner* — Hao Nguyen
(74) *Attorney, Agent, or Firm* — Holland & Knight LLP; Brian J. Colandreo, Esq.; Jeffrey T. Placker, Esq.

(57) ABSTRACT

A method and computer program product for email message association is described. A method may comprise detecting an indication of an email target of an email message. The method may further comprise determining if the email target is an intended recipient of at least a portion of the email message. The method may also comprise associating the at least a portion of the email message with the email target by adding metadata to the email message.

16 Claims, 4 Drawing Sheets

FIG. 4

```
Email Message                                        ~402

From:     joe.smith@company.com          Sent: Thur 11/03/2010 5:17 PM

To:       jon.miller@company.com; jack.miller@company.com

Cc:       jon.myer@company.com; jim.miller@company.com

Subject:  Meeting Schedules

Jon:
Your meeting time has been changed to tomorrow evening.  (Jon Miller) ~404
                                         408                    ⇖ 412

Mr. Mayor:
Your meeting time has been updated to this evening.  (Jon Mayor) ~406
                                         410                    ⇖ 414

Thanks,
Joe
```

EMAIL MESSAGE ASSOCIATION

BACKGROUND OF THE INVENTION

A single email may be addressed to multiple recipients with the same or similar name. A reader of the email may encounter the name in the body of the email message. The context of the email message may not make apparent the intended recipient. Therefore, it may be unclear which recipient is being referred to.

BRIEF SUMMARY OF THE INVENTION

In a first embodiment, a method may include detecting an indication of an email target of an email message. The method may further comprise determining if the email target is an intended recipient of at least a portion of the email message. The method may also comprise associating the at least a portion of the email message with the email target by adding metadata to the email message.

One or more of the following features may be included. The method may include detecting the indication of the email target in an addressable field of the email message. The method may also include detecting the indication of the email target in a body of the email message. Determining if the email target is the intended recipient of the at least a portion of the email message may be based upon, at least in part, requesting a user to specify the intended recipient. The method may further include displaying, in a popup interface, a plurality of email targets included in one or more addressable fields of the email message. The method may additionally include displaying, in a popup interface, a plurality of possible recipients based upon, at least in part, the indication of the email target. The metadata may be added in response to receiving an indication of the intended recipient.

In some implementations, the method may include detecting the metadata that associates the intended recipient with the at least a portion of the email message. The method may also include displaying the metadata that associates the intended recipient with the at least a portion of the email message. The plurality of possible recipients may be further based upon, at least in part, at least one of an organizational directory, and a social network.

In a second embodiment, a computer program product may reside on a computer readable storage medium and may have a plurality of instructions stored on it. When executed by a processor, the instructions may cause the processor to perform operations comprising detecting an indication of an email target of an email message. The operations may also comprise determining if the email target is an intended recipient of at least a portion of the email message. The operations may further comprise associating the at least a portion of the email message with the email target by adding metadata to the email message.

One or more of the following features may be included. The operations may include detecting the indication of the email target in an addressable field of the email message. The operations may also include detecting the indication of the email target in a body of the email message. Determining if the email target is the intended recipient of the at least a portion of the email message may be based upon, at least in part, requesting a user to specify the intended recipient. The operations may further include displaying, in a popup interface, a plurality of email targets included in one or more addressable fields of the email message. The operations may additionally include displaying, in a popup interface, a plurality of possible recipients based upon, at least in part, the indication of the email target. The metadata may be added in response to receiving an indication of the intended recipient.

In some implementations, the operations may include detecting the metadata that associates the intended recipient with the at least a portion of the email message. The operations may also include displaying the metadata that associates the intended recipient with the at least a portion of the email message. The plurality of possible recipients may be further based upon, at least in part, at least one of an organizational directory, and a social network.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 4 is another email message which may be associated with the email message association process content process of FIG. 1.

DETAILED DESCRIPTION OF THE INVENTION

Figure 1:
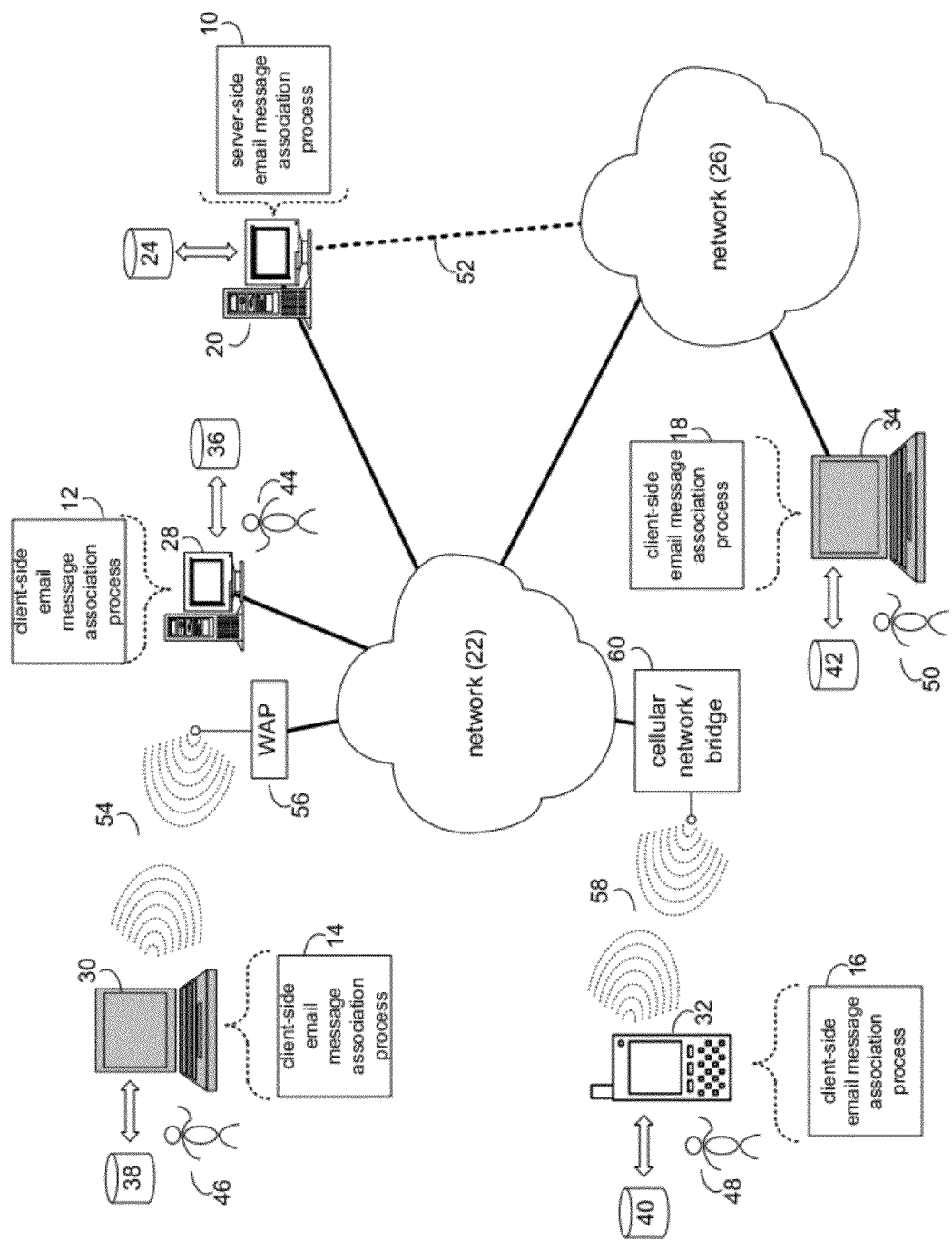
FIG. 1 is a diagrammatic view of an email message association process coupled to a distributed computing network.
Figure 2:
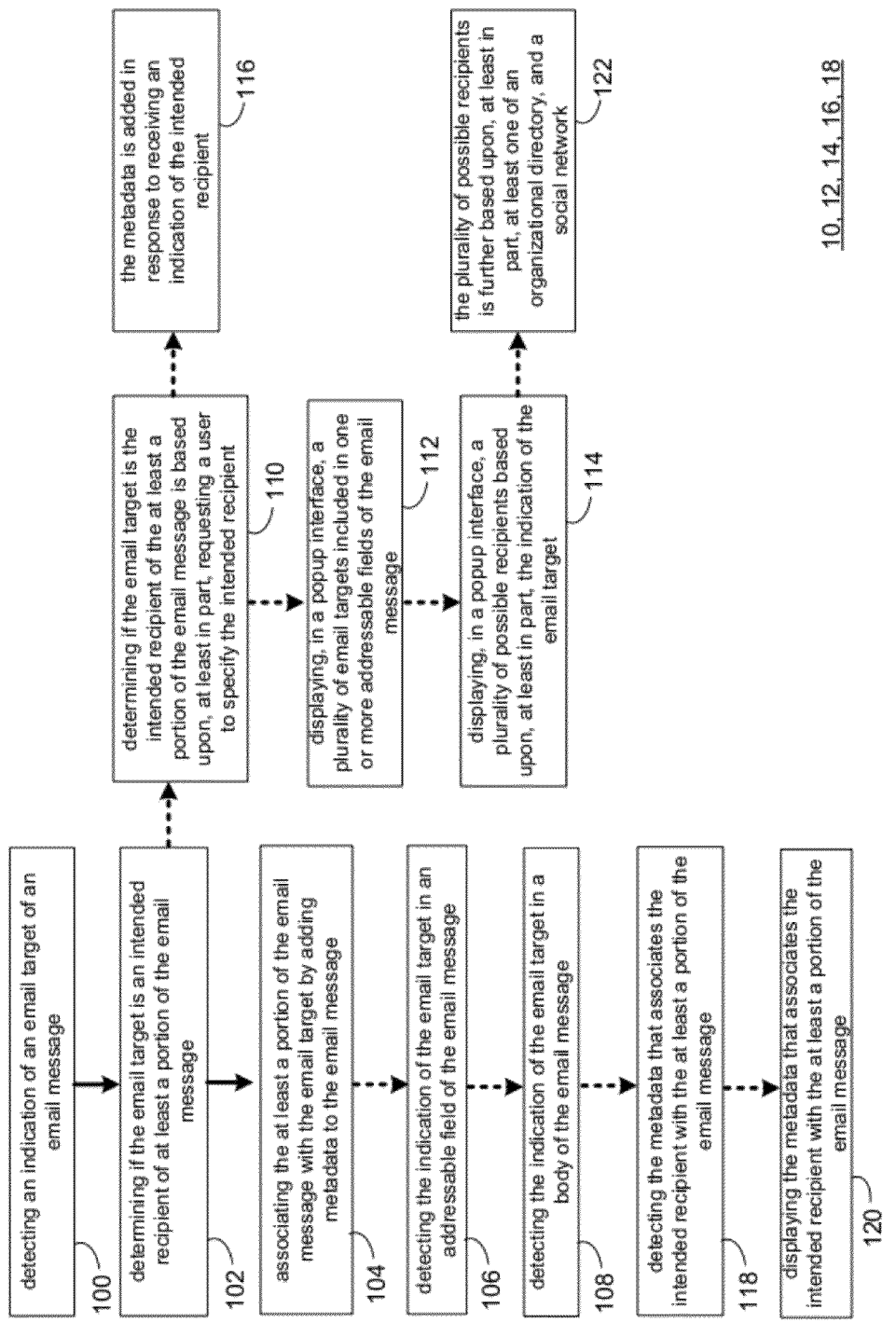
FIG. 2 is a flowchart of the email message association process of FIG. 1.

Referring to FIGS. 1 & 2, there is shown an email message association process 12. As will be discussed below, email message association process 12 may detect 100 an indication of an email target of an email message. Email message association process 12 may also determine 102 if the email target is an intended recipient of at least a portion of the email message.

Email message association (EMA) process may be a server-side process (e.g., server-side EMA process 10), a client-side process (e.g., client-side EMA process 12, client-side EMA process 14, client-side EMA process 16, or client-side EMA process 18), or a hybrid server-side/client-side process (e.g., the combination of server-side EMA process 10 and one or more of client-side EMA processes 12, 14, 16, 18).

Server-side EMA process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side EMA process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side EMA processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side EMA processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side EMA processes 12, 14, 16, 18 and/or server-side EMA process 10 may be processes that run within (i.e., are part of) an email application, such as, for example, Microsoft® Outlook®. Alternatively, client-side EMA processes 12, 14, 16, 18 and/or server-side EMA process 10 may be stand-alone applications that work in conjunction with the email application. One or more of client-side EMA processes 12, 14, 16, 18 and server-side EMA process 10 may interface with each other (via network 22 and/or network 26).

Users 44, 46, 48, 50 may access server-side EMA process 10 directly through the device on which the client-side EMA process (e.g., client-side EMA processes 12, 14, 16, 18) is executed, namely client electronic devices 28, 30, 32, 34, for example. Users 44, 46, 48, 50 may access server-side EMA process 10 directly through network 22 and/or through secondary network 26. Further, server computer 20 (i.e., the computer that executes server-side EMA process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Email Association Process

For the following discussion, client-side EMA process 12 will be described for illustrative purposes. It should be noted that client-side EMA process 12 may be incorporated into server-side EMA process 10 and may be executed within one or more applications that allow for communication with client-side EMA process 12. However, this is not intended to be a limitation of this disclosure, as other configurations are possible (e.g., stand-alone, client-side EMA processes and/or stand-alone server-side EMA processes.) For example, some implementations may include one or more of client-side EMA processes 14, 16, 18 in place of or in addition to client-side EMA process 12.

Figure 3:
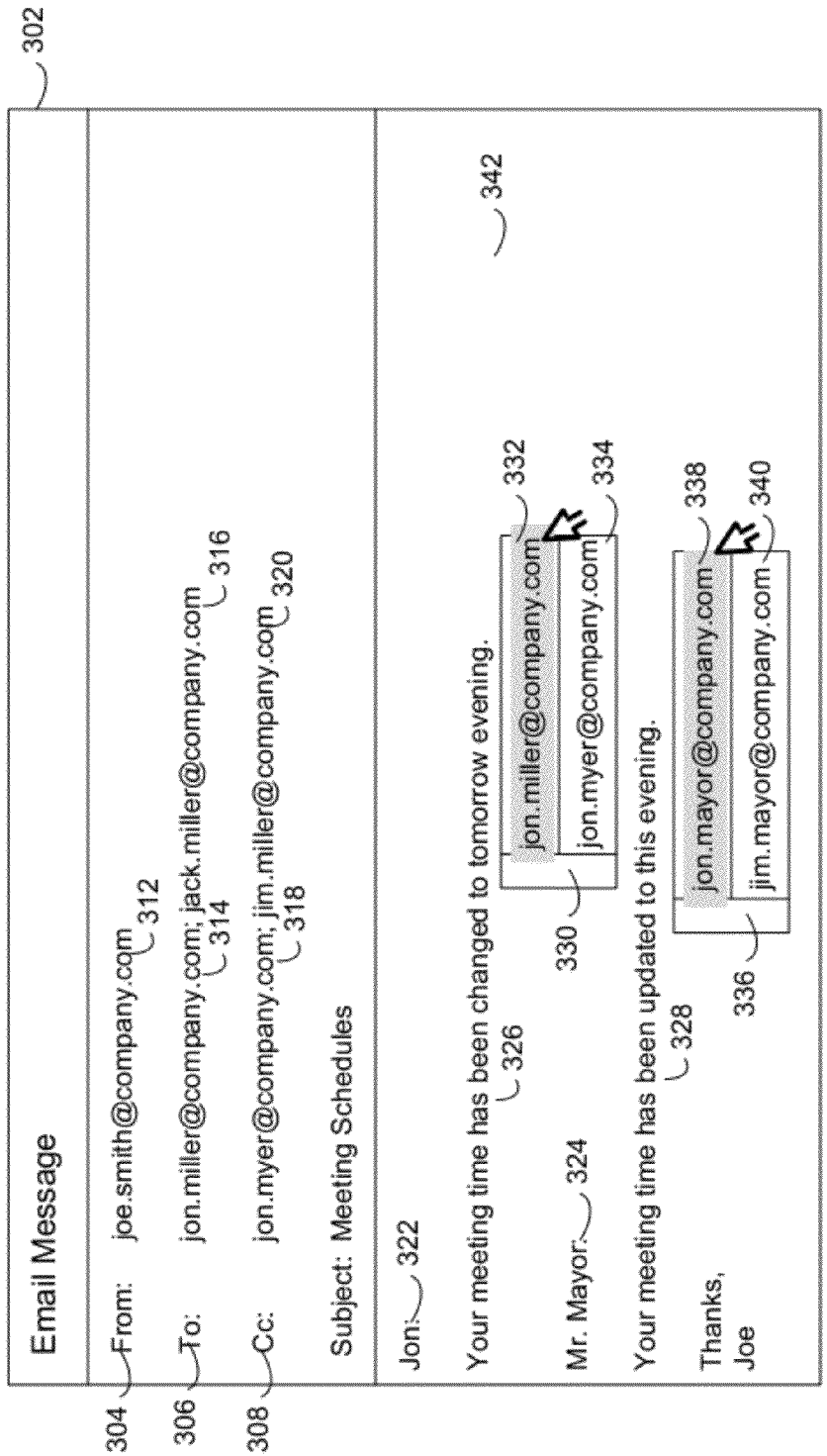
FIG. 3 is an email message which may be associated with email message association process of FIG. 1.

Referring now to FIGS. 1-3, EMA process 12 may detect 100 an indication of an email target (e.g., one or more of email addresses 312, 314, 316, 318, 320 and/or names 322, 324) of an email message (e.g., email message 302). The indication may be the presence of an email target in email message 302, or may be the action of a user (e.g., users 44, 46, 48, 50) beginning to enter (e.g., type) an email target into email message 302. Email message 302 may be a draft email message. EMA process 12 may detect 106 the indication of the email target (e.g., one or more of email addresses 312, 314, 316, 318, 320) in an addressable field (e.g., "To" field 306, "Cc" field 308) of email message 302. EMA process 12 may also detect 108 the indication of the email target (e.g., names 322, 324) in body 342 of email message 302. It should be noted that the term "email target" as used herein may describe an email address, name, user ID, screen name, social network name, or other text which may indicate a possible recipient of a portion of an email message.

Further, EMA process 12 may determine 102 if the email target (e.g., one or more of email addresses 312, 314, 316, 318, 320 and/or names 322, 324) is an intended recipient of at least a portion (e.g., portions 326, 328) of email message 302. While portions 326 and 328 are shown in FIG. 3 as text, this is for illustrative purposes only, as portions 326 and 328 may be other content including, but not limited to, images, video, audio, and/or attached files, which may be embedded or otherwise included in an email message. EMA process 12 may determine 102 if the email target (e.g., one or more of email addresses 312, 314, 316, 318, 320 and/or names 322, 324) is the intended recipient of the at least a portion (e.g., portions 326, 328) of email message 302 based upon (110), at least in part, requesting a user (e.g., users 44, 46, 48, 50) to specify the intended recipient. Further, EMA process 12 may display 112 in popup interface 330 a plurality of email targets (e.g., email targets 332, 334) included in one or more addressable fields (e.g., "To" field 306, "Cc" field 308) of email message 302. EMA process 12 may analyze text entered into email message 302 and determine which email targets to display in popup interface 330 based upon, at least in part, any email addresses or indications of names entered into email message 302. For example, and as shown in FIG. 3, since name 322 (i.e., "Jon")

was entered into email message 302, and since email addresses 314 and 318 include "Jon", EMA process 12 may display email targets 332 and 334 in popup interface 330.

Continuing with the example above, EMA process 12 may display 114 in popup interface 336 a plurality of possible recipients (e.g., possible recipients 338, 340) based upon, at least in part, the indication of the email target (e.g., names 322, 324). For example, EMA process 12 may analyze email message 302 and find name 324. Further, EMA process 12 may determine that name 324 (i.e., "Mr. Mayor") does not correspond to an email address in an addressable field (e.g., "To" field 306, "Cc" field 308). This may be because the user (e.g., users 44, 46, 48, 50) may have forgot to enter an email address corresponding to name 324 in an addressable field (e.g., "To" field 306, "Cc" field 308), or may have entered text into the body of email message 302 first, before entering an email address in an addressable field (e.g., "To" field 306, "Cc" field 308). While popup interfaces 330 and 336 are shown has popup menus, this is for illustrative purposes only, and other variations are possible. For example, popup interface 330 and/or 336 may be a popup window.

The plurality of possible recipients (e.g., possible recipients 338, 340) may further be based upon (122), at least in part, at least one of an organizational directory, and a social network. EMA process 12 may pull the possible recipients from the organizational directory or social network after searching the organizational directory or social network based upon, at least in part, text entered into email message 302.

The user (e.g., users 44, 46, 48, 50) may select one or more of email targets (e.g., email targets 332, 334) from popup interface 330 and/or one or more possible recipients (e.g., possible recipients 338, 340) from popup interface 336. The user's selection may indicate which email target (e.g., email targets 332, 334) and/or possible recipient (e.g., possible recipients 338, 340) a portion (e.g., portions 326, 328) of email message 302 is intended for. EMA process 12 may receive the user's selection, which may be an indication of the intended recipient of a portion (e.g., portions 326, 328) of email message 302. For example, the user may select email target 332 (i.e., "jon.miller @company.com") from popup interface 330, and may thereby indicate that portion 326 is intended for Jon Miller. As such, Jon Miller may be the intended recipient of portion 326 of email message 302. In another example, the user may select possible recipient 338 from popup interface 336, and may thereby indicate that portion 328 of email message 302 is intended for Jon Mayor. As such, Jon Mayor may be the intended recipient of portion 328 of email message 302.

Referring now to FIGS. 3-4, EMA process 12 may associate 104 at least a portion (e.g., portions 326, 328) of email message 302 with an email target (e.g., one or more of email addresses 312, 314, 316, 318, 320 and/or names 322, 324) of email message 302 by adding metadata (e.g., metadata 404, 406) to email message 302. Further, EMA process 12 may associate 104 at least a portion (e.g., portions 326, 328) of email message 302 with the email target (e.g., one or more of email addresses 312, 314, 316, 318, 320 and/or names 322, 324) of email message 302 by adding metadata (e.g., metadata 404, 406) to email message 302, if it is determined 102 that the email target (e.g., one or more of email addresses 312, 314, 316, 318, 320 and/or names 322, 324) is the intended recipient of the at least a portion (e.g., portions 326, 328) of email message 302. Metadata 404 and/or 406 may be added 116 in response to an indication (e.g., selection by the user) of the intended recipient (e.g., Jon Miller and/or Jon Mayor, as discussed above). Metadata data 404 and/or 406 may be, for example, the intended recipient's first and last name. Further, metadata 404 and/or 406 may be included with email message 302, which may be a draft email message, after email message 302 is sent. As shown in sent email message 402, metadata 404 (e.g., Jon Miller) and/or metadata 406 (e.g., Jon mayor) may be included with sent email message 402 after email message 302 is sent. Metadata 404 and/or 406 may also become part of email message 302, and may be included with email message 302 after it is sent (e.g., sent email message 402), forwarded, or otherwise propagated to any number of recipients. In other words, anyone who eventually receives email message 302 may also receive metadata 404 and/or 406.

Continuing with the above example, EMA process 12 may detect 118 the metadata (e.g., metadata 404, 406) that associates the intended recipient (e.g., Jon Miller, Jon Mayor) with at least a portion (e.g., portion 408, 410) of email message 402. Further, EMA process 12 may display 120 metadata (e.g., metadata 404, 406) that associates the intended recipient with at least a portion (e.g., portion 408, 410) of email message 402. Email process 12 may display metadata 404 and/or 406 based upon, at least in part, a hover action by the user. For example, a user (e.g., users 44, 46, 48, 50) reading email message 402 may hover a cursor (e.g., cursor 412 and/or 414) over or near a portion (e.g., portion 408, 410) of email message 402. In response, EMA process 12 may display metadata 404 and/or 406 (e.g., Jon Miller and/or Jon Mayor) over or near the associated portion (e.g., portion 408, 410). In this way, EMA process 12 may indicate to a reader of an email message the one or more intended recipients of the one or more portions of the email message by using sender-supplied metadata.

While metadata 404 and 406 are indicated by the first and last name of the intended recipient of the respective portion of email message 402 in FIG. 4, this is for illustrative purposes only and other variations are possible. For example, if EMA process 12 determines that the reader of email 402 is "Jon Miller", EMA process 12 may display the text of portion 408 in a different color, may highlight the text of portion 408, or may display metadata 404 on or near portion 408 without detecting a hover action. In an implementation, EMA process 12 may not display metadata 404 and/or 406 unless requested by the user, e.g., via a popup interface (not shown). Further, while metadata 404 and/or 406 are discussed herein as being the first and last name of the intended recipient, this is for illustrative purposes only, and other variations are possible. For example, other information relevant to the intended recipient, including, but not limited to, an email address, user ID, screen name, social network name, image, or other information which may indicate the intended recipient, may be included in the metadata and displayed to a reader. These features related to the metadata may be selectable by a user of EMA process 12 and/or an email application associated therewith.

EMA process 12 may pull the information discussed above from an organizational directory or social network. Additionally, a reader of email message 402 may use the associated metadata (e.g., metadata 404 and/or 406) to retrieve other information about the intended recipient from an organizational directory, social network, or repository. For example, the reader may retrieve chat histories and/or profile information associated with the intended recipient.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   detecting an indication of an email target of an email message;
   determining if the email target is an intended recipient of at least a portion of a body of the email message, including providing, in a pop-up interface, a plurality of possible recipients based upon, at least in part, the indication of the email target, wherein the plurality of possible recipients include possible recipients that are not included within one or more addressable fields of the email message, wherein the plurality of possible recipients is based upon, at least in part, a social network;

retrieving additional information about the intended recipient from the social network based upon, at least in part, the metadata, including profile information and chat history associated with the intended recipient;

in response to a user selection of at least a portion of the body of the email message associating the at least a portion of the body of the email message with the email target by adding metadata to the email message, wherein the metadata indicates that the email target is the intended recipient of the one or more portions of the body of the email message; and after the email message is sent, displaying the metadata that associates the intended recipient with the at least a portion of the body of the email message indicating to a reader of the email message the intended recipient of the at least a portion of the body of the email message in response to a hover action over the at least a portion of the body of the email message;

wherein the metadata is included with the email message when the email message is subsequently forwarded to at least one other email target.

2. The method of claim 1, further comprising:
detecting the indication of the email target in an addressable field of the email message.

3. The method of claim 1, further comprising:
detecting the indication of the email target in a body of the email message.

4. The method of claim 1, wherein determining if the email target is the intended recipient of the at least a portion of the email message is based upon, at least in part, requesting a user to specify the intended recipient.

5. The method of claim 4, further comprising:
displaying, in the popup interface, a plurality of email targets included in the one or more addressable fields of the email message.

6. The method of claim 4, wherein the metadata is added in response to receiving an indication of the intended recipient.

7. The method of claim 1, further comprising:
detecting the metadata that associates the intended recipient with the at least a portion of the email message.

8. The method of claim 1, wherein the plurality of possible recipients is further based upon, at least in part, an organizational directory.

9. A computer program product residing on a non-transitory computer readable storage medium having a plurality of instructions stored thereon, which, when executed by a processor, cause the processor to perform operations comprising:

detecting an indication of an email target of an email message;

determining if the email target is an intended recipient of at least a portion of a body of the email message, including providing, in a pop-up interface, a plurality of possible recipients based upon, at least in part, the indication of the email target, wherein the plurality of possible recipients include possible recipients that are not included within one or more addressable fields of the email message, wherein the plurality of possible recipients is based upon, at least in part, a social network;

retrieving additional information about the intended recipient from the social network based upon, at least in part, the metadata, including profile information and chat history associated with the intended recipient;

in response to a user selection of at least a portion of the body of the email message associating the at least a portion of the body of the email message with the email target by adding metadata to the email message, wherein the metadata indicates that the email target is the intended recipient of the one or more portions of the body of the email message; and after the email message is sent, displaying the metadata that associates the intended recipient with the at least a portion of the body of the email message indicating to a reader of the email message the intended recipient of the at least a portion of the body of the email message in response to a hover action over the at least a portion of the body of the email message;

wherein the metadata is included with the email message when the email message is subsequently forwarded to at least one other email target.

10. The computer program product of claim 9, further comprising instructions for:
detecting the indication of the email target in an addressable field of the email message.

11. The computer program product of claim 9, further comprising instructions for:
detecting the indication of the email target in a body of the email message.

12. The computer program product of claim 9, wherein determining if the email target is the intended recipient of the at least a portion of the email message is based upon, at least in part, requesting a user to specify the intended recipient.

13. The computer program product of claim 12, further comprising instructions for:
displaying, in the popup interface, a plurality of email targets included in the one or more addressable fields of the email message.

14. The computer program product of claim 12, wherein the metadata is added in response to receiving an indication of the intended recipient.

15. The computer program product of claim 9, further comprising instructions for:
detecting the metadata that associates the intended recipient with the at least a portion of the email message.

16. The computer program product of claim 9, wherein the plurality of possible recipients is further based upon, at least in part, an organizational directory.

* * * * *